(12) United States Patent  (10) Patent No.: US 7,384,268 B2
Browne-Wilkinson  (45) Date of Patent: Jun. 10, 2008

(54) ORTHOPAEDIC DEMONSTRATION AID

(76) Inventor: Oliver Browne-Wilkinson, 34 Newburgh Road, Action, London (GB) W3 6DQ ( * ) Notice: Subject to any disclaimer, the term of this patent is extended or adjusted under 35 U.S.C. 154(b) by 290 days.

(21) Appl. No.: 10/542,060

(22) PCT Filed: Jan. 13, 2004

(86) PCT No.: PCT/GB2004/000137

§ 371 (c)(1),
(2), (4) Date: Jul. 13, 2005

(87) PCT Pub. No.: WO2004/064010

PCT Pub. Date: Jul. 29, 2004

(65) Prior Publication Data

US 2006/0051728 A1  Mar. 9, 2006

(30) Foreign Application Priority Data

Jan. 13, 2003 (GB) ................................. 0300703.6

(51) Int. Cl.
G09B 23/28 (2006.01)
(52) U.S. Cl. .................................................... 434/274
(58) Field of Classification Search ................ 434/262, 434/267, 274
See application file for complete search history.

(56) References Cited

U.S. PATENT DOCUMENTS 2,483,034 A * 9/1949 Braeg .......................... 434/274
2,995,833 A * 8/1961 Bezark ........................ 434/274
3,140,712 A * 7/1964 Hunter ...................... 623/18.12
4,000,564 A * 1/1977 Haffner et al. .............. 434/274
4,200,995 A * 5/1980 Trella ......................... 434/274
4,235,025 A * 11/1980 Kortge ........................ 434/274
4,433,961 A * 2/1984 Chandler .................... 434/274
4,838,795 A * 6/1989 Draenert .................... 434/274
4,850,877 A * 7/1989 Mason et al. ............... 434/274
5,018,977 A * 5/1991 Wiley et al. ................ 434/274
6,361,729 B1 * 3/2002 Strover et al. .............. 264/247
6,409,516 B1 * 6/2002 Thill .......................... 434/274
6,524,111 B1 * 2/2003 Browne-Wilkinson ...... 434/274
6,908,309 B2 * 6/2005 Gil et al. .................... 434/267
6,942,488 B2 * 9/2005 Slocum et al. ............. 434/267

FOREIGN PATENT DOCUMENTS

WO  WO 03/001483  * 1/2003

* cited by examiner

Primary Examiner—Kurt Fernstrom
(74) Attorney, Agent, or Firm—Young & Thompson

(57) ABSTRACT

An orthopaedic skeletal joint demonstration aid for demonstrating surgical orthopaedic techniques includes first and second joint portions capable of being manipulated relative to one another to mimic the action of a skeletal joint. The first joint portion is detachably secured to one end of an elongate first shaft portion to enable replacement of the first joint portion. An adjustable holding mechanism holds a part of the first shaft portion remotely of the one end in a required position such that the first joint portion is at the correct anatomical orientation for the purposes of the required surgical orthopaedic procedure. The holding mechanism includes an adjustable ball and socket joint and a locking mechanism for locking the ball and socket joint when the first shaft portion is in the required position. A foot plate is provided for holding the second joint portion, and the second shaft portion in the required position.

16 Claims, 4 Drawing Sheets

ORTHOPAEDIC DEMONSTRATION AID

This invention relates to orthopaedic demonstration aids, and is concerned more particularly, but not exclusively, with orthopaedic skeletal joint demonstration aids for demonstrating surgical orthopaedic techniques.

Orthopaedic skeletal joint demonstration aids are known which consist of one or more facsimile human skeletal bones capable of demonstrating each stage of surgical alteration of the bone or bones in an orthopaedic technique to be demonstrated, including cutting of the bone and fitting of an orthopaedic prosthesis.

British Patent No. 2264190 discloses an orthopaedic demonstration aid in the form of a facsimile of the human skeletal knee with full femur and tibia, excluding patella, connected together in the correct anatomical position. Each of the femur and tibia comprises a main portion and a number of detachable pieces connected to the main portion by magnetic attraction. These pieces may be separately detached from the main portions to show different stages of an orthopaedic implant technique, and to accept the correct orthopaedic prosthesis. Once the demonstration has been completed, the prosthesis can be removed and the detachable pieces reattached so as to place the aid in its original state, suitable for reuse.

British Patent No. 2294573 discloses an orthopaedic demonstration aid in the form of a facsimile human skeletal bone having joint portions at opposite ends and an elongate hollow shaft interconnecting the joint portions and having a canal extending therealong. The facsimile human skeletal bone comprises two separable component parts, each consisting of a respective one of the joint portions and respective portions of the shaft and canal detachably connected together by a projection on one component part engaging within a receiving recess in the other component part in such a Manner as to provide intercommunication between the canal portions within the two component parts.

However, in order to be able to mimic the natural kinematics of a skeletal bone, it is necessary to mimic its relationship with the main ligaments. Furthermore orthopaedic techniques have now evolved to work in conjunction with image guided surgical computer software dealing with the kinematics of the replacement prosthesis of the bone in relation to the rest of the human anatomy. There is a need for orthopaedic human skeletal demonstration aids capable of mimicking the kinematics of human skeletal bones.

It is an object of the invention to provide an improved orthopaedic demonstration aid which is capable of mimicking the natural kinematics of the bone in the required manner and which is particularly convenient in use.

According to the present invention there is provided an orthopaedic demonstration aid for demonstrating surgical orthopaedic techniques, the aid comprising first and second facsimile bone portions, an elongate first shaft portion to one end of which the first bone portion is secured, and adjustable holding means for holding a part of the first shaft portion remotely of said one end in a required position such that the first bone portion is at the correct anatomical orientation for the purposes of the required surgical orthopaedic procedure.

In a preferred implementation the aid is an orthopaedic skeletal joint demonstration aid and the first and second facsimile bone portions are first and second joint portions capable of being manipulated relative to one another to mimic the action of a skeletal joint However other implementations can also be envisaged in which the aid is to be used for demonstrating trauma, in which a bone is broken or shattered, and the first and second bone portions are two portions of a facsimile fractured bone which require to be set in required positions relative to one another.

Such an orthopaedic skeletal joint demonstration aid may be used to demonstrate surgical orthopaedic techniques in joint replacement or modification, such as in hip, knee, shoulder, spine, digit, wrist, elbow and ankle replacement or modification, both for humans and animals. It may also be used in demonstrating power surgical tools and hand instruments, as well as in conjunction with image guided surgical computer software. The aid may serve to position the joint in the correct anatomical orientation so as to mimic the effect of the surgical technique being practiced on an actual patient.

The invention also provides an orthopaedic joint demonstration aid for demonstrating surgical orthopaedic techniques, the aid comprising first and second facsimile joint portions capable of being manipulated relative to one another to mimic the action of a skeletal joint, and adjustable facsimile ligament means securing the joint portions together, and preferably incorporating lateral portions resiliently held under tension.

Such an arrangement is particularly advantageous as it enables mimicking of the ligament balancing provided in an actual skeletal joint, so that the facsimile joint behaves in the same way as an actual skeletal joint during the required surgical procedures.

The invention also provides an orthopaedic skeletal joint demonstration aid for demonstrating surgical orthopaedic techniques, the aid comprising first and second facsimile joint portions capable of being manipulated relative to one another to mimic the action of a skeletal joint, and a patella portion overlying the junction between the first and second joint portions and held in position by ligament means.

In addition the invention provides an orthopaedic skeletal joint demonstration aid for demonstrating surgical orthopaedic techniques, the aid comprising first and second facsimile joint portions positioned relative to one another to mimic the action of a skeletal joint, and an elongate first shaft portion to one end of which the first joint portion is detachably secured by a connector part engaging within a receiving passage in the fist shaft portion in such a manner as to resist axial rotation of the first joint portion relative to the first shaft portion.

In addition the invention provides an orthopaedic skeletal joint demonstration aid for demonstrating surgical orthopaedic techniques, the aid comprising at least one facsimile joint portion, an elongate shaft portion to one end of which the joint portion is secured, facsimile ligament means connected to the joint portion, and quick release means for releasing the joint portion and the ligament means from the shaft portion when the joint portion and the ligament means are to be replaced for a new surgical orthopaedic procedure.

In addition the invention provides an orthopaedic demonstration aid for demonstrating surgical orthopaedic techniques, the aid comprising at least one facsimile joint portion, and a facsimile skin portion overlying the joint portion.

In order that the invention may be more fully understood, a preferred orthopaedic skeletal joint demonstration aid in accordance with the invention will now be described, by way of example, with reference to the accompanying drawings, in which.

Figure 8:
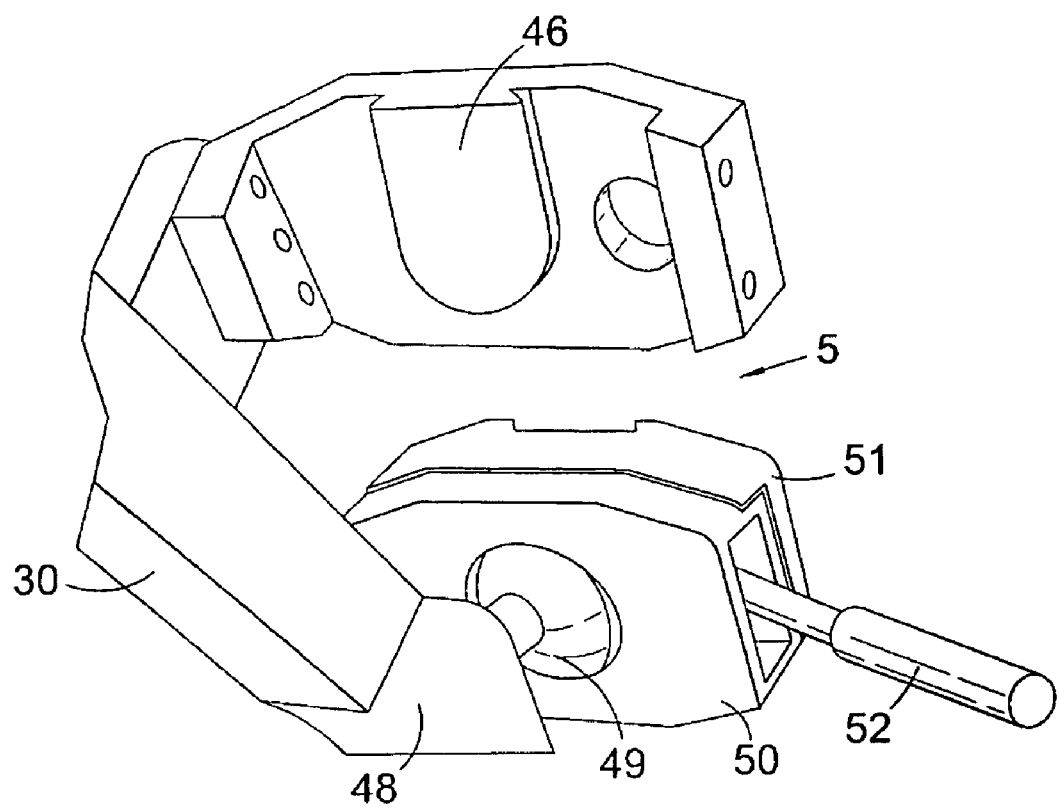

FIG. 8 is a perspective view of the holding portion of the aid of FIG. 1 in disassembled condition The orthopaedic skeletal joint demonstration aid to be described below with reference to the drawings is a facsimile human leg having both portions mimicking the human knee joint and portions mimicking the form of the human thigh, calf and foot. However, the invention is also applicable to a wide range of other forms of orthopaedic skeletal joint demonstration aid, including aids incorporating only portions mimicking parts of the skeleton, and aids mimicking hip, elbow, shoulder, spine and other joints.

Figure 1:
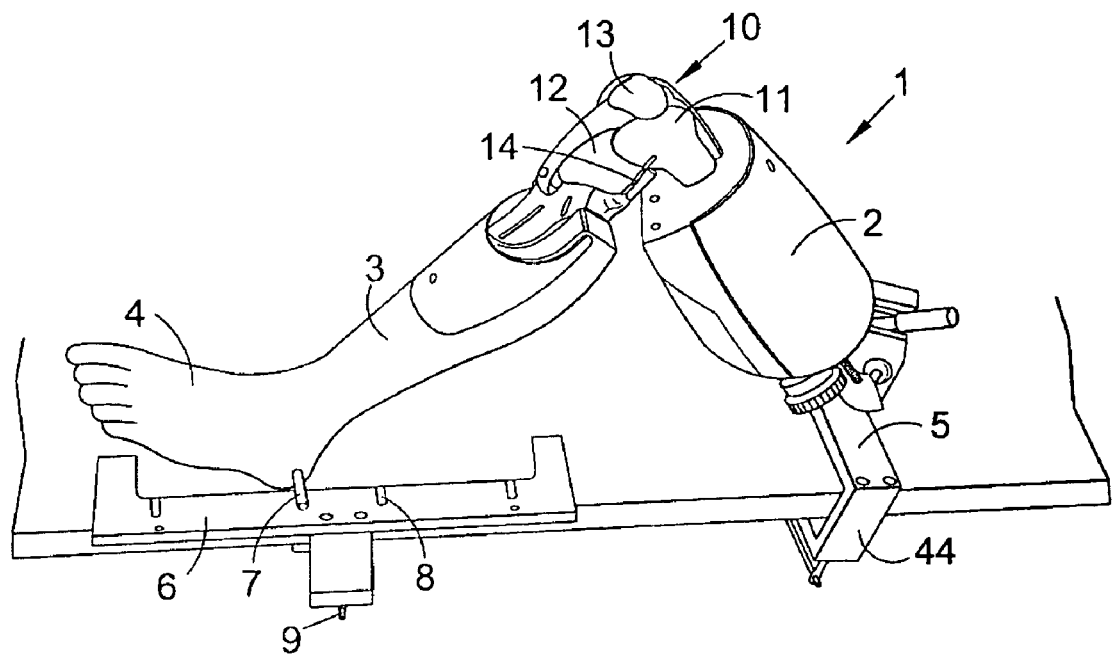
FIG. 1 is a perspective view of the aid in a demonstration position with a simile skin portion removed.

Referring to FIG. 1 the aid 1 comprises a facsimile human thigh portion 2, a facsimile human calf portion 3 and a facsimile human foot portion 4, as well as a holding mechanism 5 and a foot plate 6 provided for holding the thigh portion 2 and the calf portion 3 in the required relative positions mimicking the correct anatomical orientation for the purposes of the required surgical orthopaedic procedure. As will be described more fully below the holding mechanism 5 is capable of being locked in position so as to orientate the thigh portion 2 at the required angle, and the foot portion 4 is provided with two outwardly extending pegs 7 (one projecting from each of the sides of the heel) capable of being engaged in one of a series of receiving notches 8 in the foot plate 6 to orientate the calf portion 3 at the required angle (each notch corresponding to a different angle, e.g. 90 degrees, 10 degrees, 125 degrees, etc.). The foot plate 6 is provided with a screw clamp 9 by means of which it may be detachably secured to an operating surface. Although not shown in the figures, the foot plate 6 is connected to the holding mechanism 5 by a predetermined length of cord such that the foot plate 6 is spaced from the holding mechanism 5 by the required distance if the foot plate 6 is positioned such that the cord is taut prior to fixing of the foot plate 6. This ensures that the calf portion 3 is held at the required angles when engaged with the receiving notches 8. The aid 1 also comprises a facsimile knee joint 10 consisting of a first (femur) joint portion 11, a second (tibia) joint portion 12, a facsimile patella portion 13 and a facsimile ligament portion 14.

Figure 2:
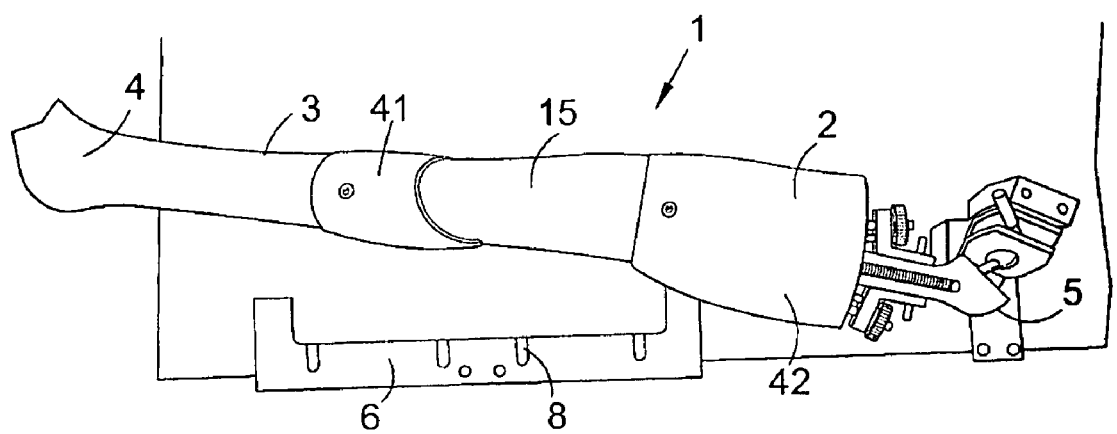
FIG. 2 is a view from above of the aid of FIG. 1 in a relaxed position with the facsimile skin portion in place.

FIG. 2 shows the aid 1 from above with the foot portion 4 detached from the foot plate 6, and with a detachable facsimile soft tissue (or skin) portion 15 in place so as to cover the knee joint. The facsimile soft tissue portion 15 is made of an inscissable silicone material mimicking the properties of human soft tissue and can be left in position during a surgical procedure, including cutting such as to cut the soft tissue portion 15. In a variant embodiment the soft tissue portion may be precut at the location in which surgical cutting is required.

Figure 6:
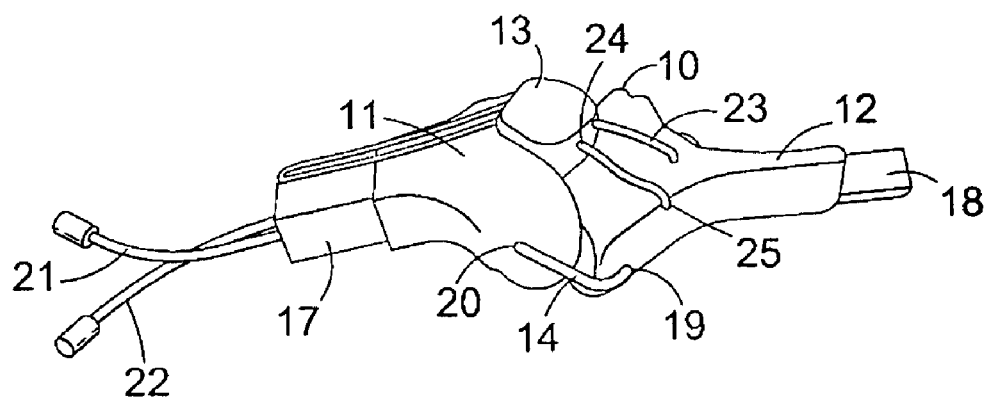
FIG. 6 is a perspective view of the joint portions and patella portion of the aid of FIG. 1 in disassembled condition.

So far as the demonstration of surgical techniques is concerned, the most important part of the aid is the knee portion 10, and this is shown in disassembled condition in FIG. 6 from which it will be seen that the first and second joint portions 11, 12 mimic the form of the joints of the human femur and tibia and have square-section connecting parts 17 and 18 adapted to detachably engage within receiving square-section passages in aluminium box-section shaft members of the thigh portion 2 and the calf portion 3. Each of the thigh portion 2 and the calf portion 3 is made up of several premoulded parts indicative of the soft tissue (or subdermal layer) that are detachably connected to the associated shaft member. Furthermore the facsimile ligament portion 14 is in the form of a continuous loop of cord passing through a cross-passage 19 in the second joint portion 12 and two symmetric passages 20 in the first joint portion 11 such that the two ends 21 and 22 of the ligament portion 14 pass through a central canal within the connector 17 to enable them to be connected to a tensioning arrangement after passing through a canal within the shaft member of the thigh portion, as will be described in more detail below. The patella portion 13 is held in place by a further ligament portion 23 in the form of a closed loop of cord passing through symmetric passages 24 in the patella portion 13 and having its ends glued within passages 25 in a tibial tuberosity of the second joint portion 12. The ligament portions 14 and 23 are each glued within the passages in the second joint portion 12 and the patella portion 13 (but not within the passages 20 in the first joint portion 11).

The manner in which the ligament portions 14 and 23 are tensioned will now be described with reference to FIGS. 3 and 4. As best seen in FIG. 4, the second joint portion 11 is detachably connected to the thigh portion 2 (shown in this figure with an upper cover part removed) by the connector part 17 engaging within the square-section shaft member 30 of the thigh portion. The shaft member 30 is provided with side windows 31 by means of which the ends 21 and 22 of the ligament portion 14 may pass laterally out of the shaft member 30 to engage with the tensioning mechanism comprising two adjusting screws 32 and 33 having milled adjusting heads and extending through two angled flanges 34 and 35 (to permit proper drawing of the ligament portion ends) connected to the shaft member 30. The ligament portion ends 21 and 22 are provided with ferrules which are detachably connectable to receiving parts 36 and 37 on the ends of the screws 32 and 33. The connecting parts 36 and 37 are maintained under spring tension so as to enable each ferrule to be hooked into the appropriate part from the side with the part compressed against the spring force and for the ferrule to be positively engaged to tension the ligament portion 14 after the part has been released.

The tensioning screws 32 and 33 may be turned to adjust the tension applied to each of the ends 21 and 22 so that the tension of each part can be independently adjusted to maintain the knee joint perfectly balanced with the same gap on either side of the joint both when the knee is in flexion and in extension (straight). The trimming of the knee ligaments (by partial cutting) in a surgical procedure may therefore be simulated by appropriate adjustment of the tensioning screws 32 and 33. It will be appreciated that the connection of the ligament portion ends 21 and 22 to the tensioning screws 32 and 33 provides a quick-release mechanism by which the ligament portion 14 may be released to enable the knee joint to be removed from the aid after completion of a surgical procedure and replaced by a fresh knee joint. It is also important that the tensioning should allow sufficient resilience to permit a small amount of medial and lateral flexing of the knee joint. In an alternative arrangement the ligament portion ends 21 and 22 are connected to the tensioning screws 32 and 33 by turnbuckle connectors which are adjustable by turning of the turnbuckle connectors. In this case the resilience is imparted to the ligament portion by separate springs provided at ligament portion ends.

Figure 3:
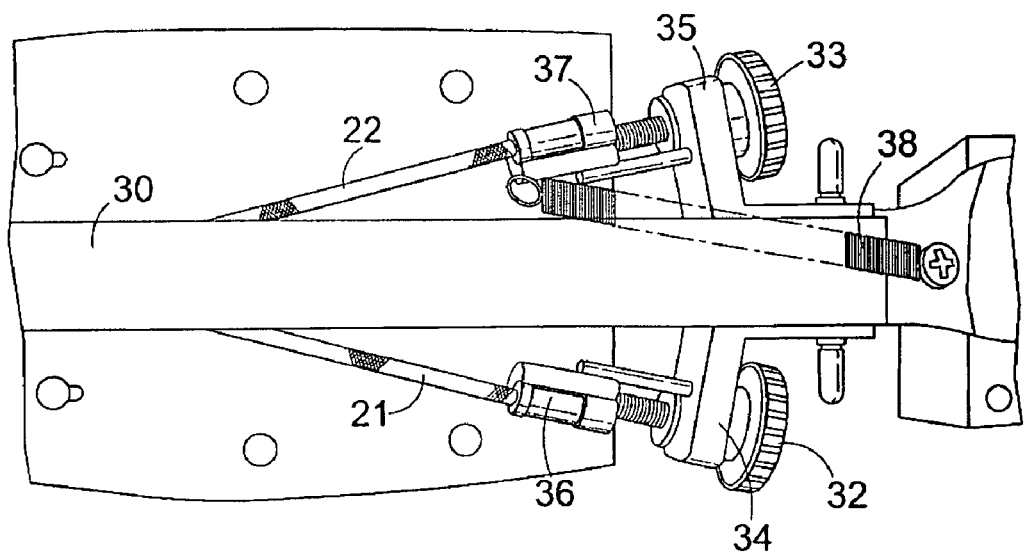
FIG. 3 is a detailed view of the arrangement for tensioning the ligament in the aid of FIG. 1.
Figure 4:
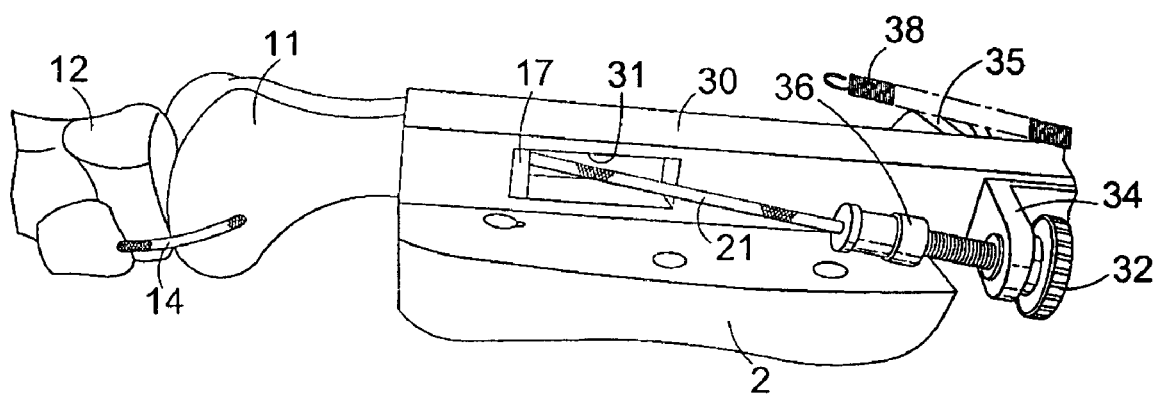
FIG. 4 is a side view of part of the aid of FIG. 1 showing the ligament tensioning arrangement.

Also shown in FIGS. 3 and 4 is a spring 38 for tensioning the ligament portion 23 in the correct way for positioning of the patella 13, although ligament portion 23 is not shown connected to this spring 38 in the figures. Although not shown in the figures, the free loop of the ligament portion 23 passes through a passage in the thigh portion and is engaged with the end of the spring 38 so as to provide the correct anatomical positioning of the patella portion 13 in relation to the femur and the tibia.

In a variant the patella portion is cast onto a piece of fabric that is folded together and stitched along the seam. The piece of fabric is arranged to match the width and flexibility of the actual patella ligament and is relatively rigid, so that it acts correctly when rotated laterally to the side of the knee joint to reveal the distal femur condiles and the proximal tibia plateau. A first buttonhole is stitched in the fabric for engagement by a hook connected to the spring 38, and a second buttonhole is stitched in the fabric for engagement by a self tapping screw screwed into a recess in the second joint portion just above the tibial tuberosity so that it is flush fitting on the surface of the bone.

Figure 5:
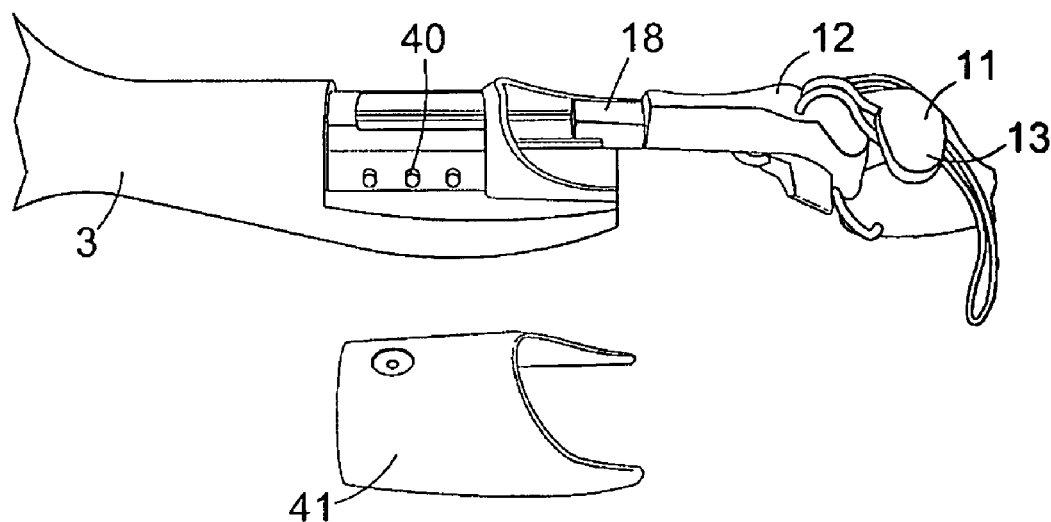
FIG. 5 is a perspective view of another part of the aid of FIG. 1 shown in disassembled condition and with a cover portion removed.

FIG. 5 shows the connection of the second joint portion 12 to the calf portion 3 by engagement of the connector 18 within a square-section passage in the shaft member of the calf portion 3 (the connector 18 being shown not yet fully pushed into the end of the receiving passage).

The calf portion 3 includes connecting nipples 40 symmetrically positioned on either side of the calf portion 3 for engaging within corresponding recesses in the soft tissue portion 15 (see FIG. 2) so as to securely hold the soft tissue portion 15 in position by means of a cover portion 41 screwed to the calf portion 3 as shown in FIG. 2. The soft tissue portion 15 is thereby securely attached to the calf portion 3 by being trapped between the cover portion 41 and the calf portion 3. Although not shown in the figures a similar arrangement may be utilised for connecting the soft tissue portion 15 to the thigh portion 2, the detachable cover being shown at 42 in FIG. 2. These connection arrangements enable the soft tissue portion 15 to be held under tension over the knee joint so as to mimic the flexing of the skin as the knee joint is bent.

Figure 7:
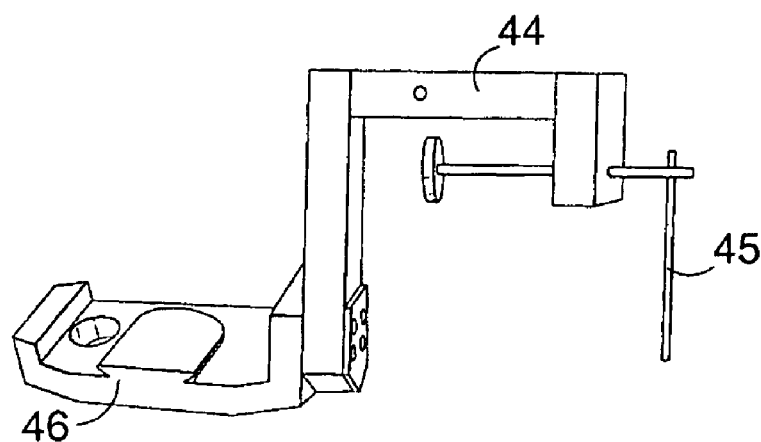
FIG. 7 is a perspective view of a clamp of the aid of FIG. 1.

As may be seen in FIG. 1, the holding mechanism 5 incorporates a screw clamp 44 for detachably attaching the holding mechanism 5 to an operating surface. FIG. 7 shows the screw clamp 44 including the adjusting screw 45 by means of which the clamp 44 may be secured to the operating surface in a known manner. The screw clamp 44 is connected to a plate 46 of the holding mechanism 5 that is shown in a disassembled state in FIG. 8. As best seen in FIG. 8 the holding mechanism also includes a locking assembly 47 connected on one side to the plate 46 and on the other side to a hip portion 48 attached to the end of the shaft member 30. The connection of the plate 46 to the hip portion 48 is by means of a ball 49 held within a receiving socket between two plates 50 and 51 that are capable of being moved together and apart by a locking lever 52. When the locking lever 52 is in a released position the plates 50 and 51 are held apart sufficiently to enable the ball 49 to be rotated within the socket to permit adjustment of the position of the shaft member 30. However, when the locking lever 52 is moved into in a locking position the plates 50 and 51 are compressed against the ball 49 in such a manner as to prevent the ball 49 from being rotated within the socket so that the shaft member 30 is locked in position. The hip portion 48 is connected to the ball 49 at a compound angle such that the thigh portion is held at the correct anatomical angle in two mutually perpendicular planes, that is at approximately 135 degrees on one plane and at approximately 15 degrees in the other plane relative to the pelvis. This ensures the correct alignment in the aid of the anatomical axes of both the femur and the tibia relative to the mechanical axis passing through the hip and knee joints.

It will be appreciated that various modifications of the above-described demonstration aid are possible to adapt it for demonstration of particular surgical orthopaedic techniques, and, in each case, the aid may be in the form of a facsimile of one or more bones or a portion of one or more bones. For example, in addition to the arrangement described above for tensioning the facsimile collateral ligaments, a similar but separate arrangement may be provided for tensioning facsimile cruciate ligaments provided on the inside of the knee joint. The aid may also be used to demonstrate other types of surgical technique, for example a hip replacement operation.

The invention claimed is:

1. An orthopaedic demonstration aid for demonstrating surgical orthopaedic techniques, the aid comprising first and second facsimile bone portions, an elongate first shaft portion to one end of which the first bone portion is secured, an elongate second shaft portion to one end of which the second bone portion is detachably secured, adjustable holding means for holding a part of the first shaft portion remotely of said one end in a required position such that the first bone portion is at the correct anatomical orientation for the purposes of the required surgical orthopaedic procedure and releasable securing means for holding a part of the second shaft portion remotely of said one end in a required position such that the second bone portion is at the correct anatomical orientation for the purposes of the required surgical orthopaedic procedure.

2. An aid as claimed in claim 1, wherein the first and second facsimile bone portions are first and second joint portions capable of being manipulated relative to one another to mimic the action of a skeletal joint.

3. An aid as claimed in claim 1, wherein the holding means comprises an adjustable ball and socket joint and a locking mechanism for locking the ball and socket joint when the first shaft portion is in the required position.

4. An aid as claimed in claim 1, wherein the first bone portion is detachably secured to the first shaft portion to enable replacement of the first bone portion.

5. An aid as claimed in claim 1, wherein the first shaft portion has the form of an upper leg and the second shaft portion has the form of a lower leg and foot.

6. An orthopaedic demonstration aid for demonstrating surgical orthopaedic techniques, the aid comprising first and second facsimile bone portions, an elongate first shaft portion to one end of which the first bone portion is secured, an elongate second shaft portion to one end of which the second bone portion is detachably secured, adjustable holding means for holding a part of the first shaft portion remotely of said one end in a required position such that the first bone portion is at the correct anatomical orientation for the purposes of the required surgical orthopaedic procedure, and releasable securing means for holding a part of the second shaft portion remotely of said one end in a required position such that the second bone portion is at the correct anatomical orientation for the purposes of the required surgical orthopaedic proceure wherein the releasable securing means comprises a foot plate for releasable attachment to a fixed support and detachable connection means for connecting said part of the second shaft portion to the foot plate, the detachable connection means comprising a series of connection points spaced apart on the foot plate to which said part of the second shaft portion is selectively connectable.

7. An orthopaedic skeletal joint demonstration aid for demonstrating surgical orthopaedic techniques, the aid comprising first and second facsimile joint portions capable of being manipulated relative to one another to mimic the action of a skeletal joint, and adjustable facsimile ligament means extending through passages in the first and second joint portions and securing the joint portions together wherein the ligament means forms a continuous loop extending through a passage in the second joint portion and having lateral portions extending through respective passages in the first joint portion into a central duct opening outwardly of the first joint portion.

8. An aid as claimed in claim 7, wherein the ligament means has lateral portions resiliently held under tension.

9. An aid as claimed in claim 8, wherein adjustable tensioning means are provided to which the lateral portions are releasably attachable.

10. An aid as claimed in claim 9, wherein the tensioning means comprises at least one adjusting screw threaded through a support flange and having an end part to which one of the lateral portions is releasably attachable.

11. An orthopaedic skeletal joint demonstration aid for demonstrating surgical orthopaedic techniques, the aid comprising first and second facsimile joint portions positioned relative to one another to mimic the action of a skeletal joint, the first joint portion being formed with an axial connector part for detachably securing the first joint portion to one end of an elongate first shaft portion and shaped to engage within an axial receiving passage in the first shaft portion in such a manner as to resist axial rotation of the first joint portion relative to the first shaft portion.

12. An aid as claimed in claim 11, wherein the second joint portion is formed with a connector part for detachably securing the first joint portion to one end of an elongate first shaft portion and shaped to engage within a receiving passage in the second shaft portion in such a manner as to resist axial rotation of the second joint portion relative to the second shaft portion.

13. An aid as claimed in claim 11, further comprising facsimile ligament means connected to the joint portion, and quick release means for releasing the joint portion and the ligament means from the shaft portion when the joint portion and the ligament means are to be replaced for a new surgical orthopaedic procedure.

14. An aid as claimed in claim 11, further comprising a facsimile soft tissue portion overlying the joint portion.

15. An aid as claimed in claim 14, wherein the soft tissue portion is held in tension over the joint portion.

16. An aid as claimed in claim 14, wherein the soft tissue portion is detachably attached to the aid to permit it to be replaced.

* * * * *